UNITED STATES PATENT OFFICE.

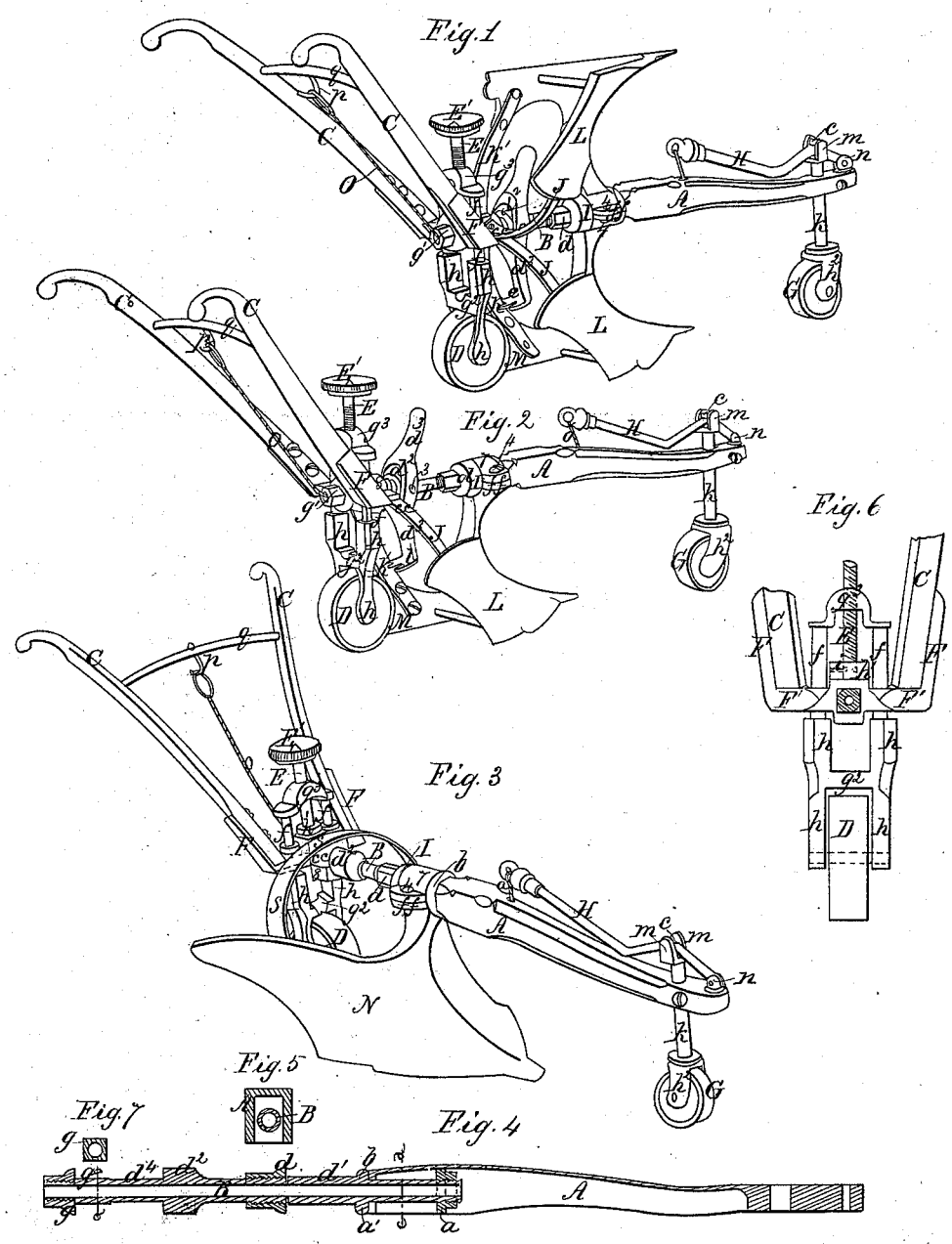

ZOPHAR W. STURTEVANT, OF DUNSTABLE, MASSACHUSETTS.

IMPROVEMENT IN PLOWS.

Specification forming part of Letters Patent No. 97,828, dated December 14, 1869.

*To all whom it may concern:*

Be it known that I, ZOPHAR W. STURTEVANT, of Dunstable, in the county of Middlesex and State of Massachusetts, have invented certain new and useful Improvements in Plows, of which the following is a full, clear, and exact description, reference being had to the accompanying drawings, making part of this specification, in which—

Figures 1, 2, and 3 are each a perspective elevation—the first of the reversible double plow, the second with one of the plows removed, and the third with a double or right-and-left mold-board plow applied to the shaft in place of the former. Fig. 4 is a longitudinal sectional elevation of the beam and shaft; Fig. 5, a cross-section of the beam at $c\ d$; and Fig. 6, a cross-section just forward of the handles, showing the manner of connecting them with their supporting-frame, and the latter with the rear end of the shaft. Fig. 7 is a cross-section of the shaft at $a\ b$.

This invention relates to that kind of plows which are used for side-hill plowing, or where all the furrows are turned one way and in either direction; and it has for its object to provide a universal plow, or one that has removable, changeable, and reversible operative parts that render it capable of performing all or many of the various kinds of plowing, and also of being conveyed from place to place upon a farm or within reasonable distances by adjustable wheels which raise the plowshare off the ground.

In constructing my improved plow, the box-beam A is formed with the sides and top, except at the forward end, and with heads or bridge-pieces $a$ and $a'$, by which to connect the shaft B. This shaft is shouldered against the rear head, $a'$, and, passing through both, is nutted against the forward one, thus holding the shaft and beam firmly together. On the forward part of this shaft, between the collar $b$ and the adjustable screw-nut $d$, or a hub or collar, is the forward plow-journal, $d'$, on which to hang the reversible double plow or any other, and to the rear of the nut $d$ is a hub, $d^2$, secured to the shaft or formed thereon. On this hub $d^2$, I hang a lever, $d^3$, by pivots 3, which pass through the side of an elongated central opening into the hub. The lever swings on the pivots and its upper end rises above the shaft, convenient for operating, while its lower end or portion depends below, and has a forked extremity, $e$, turned rearward. This lever is for holding the plows in position.

Behind the hub $d^2$ is a rear plow-journal, $d^4$, and to the rear of this the shaft is squared, and this square portion $g$ holds the handle-supporting frame F, which receives it, and which is secured by a screw-nut, $g'$, applied to the rear end of the shaft.

Directly under the rear end of the shaft and the lower extremity of the handles C is an adjustable raising-wheel, D, which revolves on a spindle supported by side portions, $h$, united with a cross-bar, $g^2$, and, rising above the latter, terminate in two guide-rods, $f$. These guide-rods pass through the base of the handle-supporter, and are connected at their top ends by a cross-head, $g^3$, and movable to raise and lower the wheel D by a screw, E, operated by a wheel, E', or by a crank or a wrench, if preferred. The lower end of the screw turns in a hub or step, $h'$, formed on the top of the base F', and held by a pin, $i$, in the usual way. The upper portion of this screw works in the cross-head.

At the forward end of the beam I arrange a second raising-wheel, G, between cheeks $h^2$, formed on a top plate and secured to the lower end of a vertical rod, $k$, passing through the beam. A stand with ears $m$ is fastened to the top end of this rod, and a pin, $c$, passes through both ears. A lever, H, is arranged between the ears $m$ under the pin $c$, and its forward end is pivoted to a stand, $n$, or ears rising from the end of the beam. This lever H extends back over the beam, and is operated by a cord, $o$, attached to its rear end, and passing through a hole in the top of the beam, thence through the whole length of the hollow shaft, and out at its rear end. A ring is applied to the free end of this cord to be placed over a hook, $p$, depending from the cross-rod $q$ between the handles, all as clearly shown in the drawings. The double or reversible plow (shown in Fig. 1) is formed with half-box bearings, by which the plow-shares are applied to the shaft. The forward bearing or connection, I, is applied to the journal $d'$, and the rear bearing, $c\ c$, to the journal $d^4$, and both are secured by bolts or screws 4, passing through the flanges $f\ f$ or through one flange into the other. The rear bearing is formed on the extremity of the curved braces J and on the top of the back braces, K, and either of the plows or plowshares L may be removed from the shaft and box-caps 7 and 8 applied, as shown in Fig. 2, and thus form a common plow; but this may be a right or a left hand plow, as the user may elect; or it may be changed from a right to a left hand plow at any time, and with but little trouble or delay, simply by removing the screws and the caps and substituting the other plow or mold-board for the one on the shaft.

It is sometimes important or convenient to use a double-mold-board plow, or one having a mold-board turning outward on each side, as shown in Fig. 3. This kind of a plow can be easily applied to the shaft in place of either of the others, if constructed and arranged as here shown.

The double-mold-board plow is no new device, and I make no claim for novelty in the form or shape of this or either of the others; but the means employed for making plows changeable, reversible, and operative, in the manner shown and described, as also the construction and arrangement of the shaft, the beam, the raising-wheels and their operating connections, and the lever $d^3$, or some equivalent device, for holding the plows in position, I believe to possess sufficient novelty to sustain a patent. It will be seen that the lower end, $e$, of the lever $d^3$ forks into the back brace K a little above the heel M of the plow, and when the top plow (seen in Fig. 1) is reversed and brought into the position of the lower one, another fork in the lower end of the lever engages with the brace K'; or both of these braces may be arranged more centrally, so as to require but one fork in the end of the lever. The double-mold-board plow N may be held in a set position by closely-fitting bearings on the shaft; or a cross-bar, with a vertical projection, may be arranged between the rear portions of the mold-boards, contiguous to the lower forked end of the lever $d^3$, and thus hold, or aid in holding, this plow in position. When either or any of the plows are in use, the cord $o$ is released, and the rear end of the lever H and the wheel G allowed to rise; and the rear wheel, D, is raised by turning the screw E, and this lets the plow down for plowing; and when moving such plow from the storage-place to the field or back to the barn or shed, or from one part of the field to another, a few turns of the screw E and a pull on the cord $o$ forces the wheels down and raises the plow from the ground, when, by connecting the ring of the cord with the hook $p$, the plow may be easily moved to any reasonable distance without any injury to itself or to grass or greensward over which it is drawn, whereas in thus moving a common plow it is liable to be injured, and almost certain to cut or tear the greensward and spoil the grass.

For side-hill plowing, or where all the furrows are turned one way and in either direction, I use the double reversible plow, constructed and arranged as shown in Fig. 1; and after turning a furrow with one of the plowshares I bring the whole weight of the plow onto the rear wheel, D, by bearing down on the handles. I then release the fork $e$ of the lever from the back brace K, and turn the upper plow down and connect the fork $e$ to the back brace K', turn the team round, resume plowing, and turn the furrow the same way as before.

For ordinary plowing, I generally remove one of the plowshares L and apply the box-caps 7 and 8, as shown in Fig. 2, and this makes in form a common plow, but removable to substitute another; and besides this advantage it carries the raising-wheels and their operating mechanisms for lifting and conveying it from one part of the field to another.

The novelty of the double-mold-board plow (shown in Fig. 3) consists in the construction, arrangement, and application of the connecting parts, or in the combination therewith of journal boxes or bearings I and $c\ c$ and the bail or curved braces S, by which the plow is applied to the shaft, and which renders it removable to substitute another.

Only one beam and shaft and one pair of handles are necessary for all the various kinds of plows, which may be furnished with bearing-boxes, and rendered capable of being applied to the shaft like those shown in the drawings.

What I claim as my invention, and desire to secure by Letters Patent, is—

1. The shaft B and the beam A, constructed and combined as shown and described, for the purpose specified.

2. The combination, with the shaft B and with the beam A, as described, of a supporting-frame, F F', and handles C, in the manner and for the purpose set forth.

3. The combination, with the shaft B, the beam A, frame F F', and handles C, as described, of the double or reversible plow L L, the parts of which are removable and changeable and adapted for a double or a single plow or a right or a left hand plow, in the manner, by the means, and for the purposes set forth.

4. The lever $d^3$, in combination with the shaft B and with the back brace K, or other connecting or holding device, for the purpose and substantially as described.

5. The raising-wheel D and its frame, and guide-rods $f$, cross-head $g^3$, and screw E, in combination with the handle-supporter F F' and the shaft B, in the manner and for the purpose described.

6. The raising-wheel G and rod $k$, having a stand or ears, $m$, and a pin, $c$, with the lever H and cord $o$, in combination with the beam A and shaft B, in the manner and for the purpose substantially as described.

7. Combining a plow or plows, L L or N, with the shaft B and beam A by box-bearings I and $c\ c$ or caps 7 and 8 and a bail or curved braces, S, as described.

8. Combining the lever $d^3$ with the shaft B by means of a hub, $d^2$, and by screws or pivots, as described.

9. The combination, with the lever H, as shown and described, of the cord o, arranged within and through the shaft B, substantially as and for the purpose specified.

10. The handle-supporter F F', as described, and which serves as a guide and a support for the rods f, a step for the screw E, and to connect the handles with the shaft B, as set forth.

11. The arrangement and combination of the wheels D and G and their connecting and operating mechanism with the beam A and the shaft B, whereby either or both ends may be raised successively or simultaneously, for the purpose and substantially as described.

ZOPHAR W. STURTEVANT.

Witnesses:
 JOHN E. CRANE,
 J. S. WHITNEY.